(12) United States Patent
Kwoka

(10) Patent No.: US 6,866,131 B2
(45) Date of Patent: Mar. 15, 2005

(54) CONTROLLABLE VISCOUS COUPLING

(75) Inventor: Georg Kwoka, Much (DE)

(73) Assignee: GKN Viscodrive GmbH, Lohmar (DE)

( * ) Notice: Subject to any disclaimer, the term of this patent is extended or adjusted under 35 U.S.C. 154(b) by 0 days.

(21) Appl. No.: 10/461,665

(22) Filed: Jun. 13, 2003

(65) Prior Publication Data
US 2004/0031657 A1 Feb. 19, 2004

(30) Foreign Application Priority Data
Jun. 13, 2002 (DE) .......................... 102 26 248

(51) Int. Cl.$^7$ ............................................. F16D 35/00
(52) U.S. Cl. ..................................... 192/57; 192/58.41
(58) Field of Search .............................. 192/48.2, 48.3, 192/57, 58.41, 58.42

(56) References Cited

U.S. PATENT DOCUMENTS

| | | | |
|---|---|---|---|
| 4,885,957 A | * 12/1989 | Taureg et al. | 475/89 |
| 5,054,596 A | * 10/1991 | Taureg et al. | 192/58.41 |
| 5,080,210 A | * 1/1992 | Hagiwara | 192/48.3 |
| 5,156,247 A | * 10/1992 | Wiese et al. | 192/48.2 |
| 5,161,658 A | * 11/1992 | Hagiwara | 192/48.3 |
| 6,443,282 B1 | * 9/2002 | Kwoka | 192/57 |
| 2004/0020739 A1 | * 2/2004 | Kwoka et al. | 192/58.1 |

* cited by examiner

Primary Examiner—Richard M. Lorence

(57) ABSTRACT

The invention relates to a controllable viscous coupling for generating a locking effect between two coupling parts rotatable relative to one another around a common longitudinal axis, more particularly for the driveline of a motor vehicle. This viscous coupling comprises a first coupling part, a second coupling part, wherein the first and the second coupling part form a sealed annular chamber. First plates are connectable to the second coupling part in a rotationally fast way. Controllable connecting apparatus allow switching between an open position in which the second plates are freely rotatable relative to the second coupling part and a closed position in which the second plates are connected to the second coupling part in a rotationally fast way.

13 Claims, 4 Drawing Sheets

DETAIL X

CONTROLLABLE VISCOUS COUPLING

FIELD OF INVENTION

The invention relates to a controllable viscous coupling for generating a coupling effect between two coupling parts which are rotatable relative to one another around a common longitudinal axis, more particularly for the driveline of a motor vehicle.

BACKGROUND OF THE INVENTION

German Publication DE 38 34 555 C1 discloses a fluid friction coupling for optionally connecting or blocking the differential effect of the drive of the driving wheels of a motor vehicle. This fluid friction coupling comprises a first coupling part provided in the form of a hub and a second coupling part which is rotatable relative to said first coupling part and which is provided in the form of a housing. The hub and housing, jointly, form a sealed annular chamber in which inner plates and outer plates are alternately received in the longitudinal direction. The inner plates are connected to the hub in a rotationally fast and axially displaceable way. The outer plates are loosely arranged between supporting rings received in the housing in a rotationally fast and axially displaceable way. By activating an operating device, there is generated an axial force so that the supporting rings are axially pressure-loaded, thus achieving a friction-locking effect between the supporting rings and the plates received therebetween. In this way, the torque transmitting capacity can be controlled and adapted to the respective desired operating conditions. A disadvantage of this fluid friction coupling for controlling the torque transmitting capacity is that as a result of the large number of components, its assembly is relatively complex.

German Publication DE 199 18 411 A1, discloses a controllable viscous coupling. In contrast to the above coupling, the annular chamber contains three functionally different sets of coupling plates of which each inner set comprises first plates and each outer set comprises second plates. The plates of the first set are connected in a rotationally fast way to the respective coupling part. To adapt the viscous coupling to different driving conditions of the vehicle, the two remaining sets comprising different diameters are provided with coupling discs for connecting or disconnecting the outer second plates to or from the housing. In this way, the torque transmitting capacity can be adapted more accurately to the existing operating conditions.

OBJECT OF THE INVENTION

It is the object of the present invention to provide a controllable viscous coupling for generating a locking effect between two coupling parts which are rotatable relative to one another around a common longitudinal axis, more particularly for the driveline of a motor vehicle, which viscous coupling has a simpler design and permits a rapid and direct adaptation to different driving conditions of the motor vehicle.

SUMMARY OF THE INVENTION

The objective is achieved by providing a controllable viscous coupling for generating a locking effect between two coupling parts rotatable relative to one another around a common longitudinal axis, more particularly for the driveline of a motor vehicle. This inventive coupling comprises a first coupling part, a second coupling part, wherein the first and second coupling parts form a sealed annular chamber which is at least partially filled with a highly viscous medium. First plates are connected to the first coupling part in a rotationally fast way and second plates are connectable to the second coupling part in a rotationally fast way, wherein the first and second plates are arranged in the annular chamber so as to alternate in the longitudinal direction. A controllable connecting means is provided which is settable between an open position in which the second plates are freely rotatable relative to the second coupling part, and a closed position in which the second plates are connected to the second coupling part in a rotationally fast way. The connecting means extends along the length of the annular chamber and, when closed, synchronously acts axially on the end faces of the second plates.

The advantage of this embodiment is that when the control system for driving dynamics controllingly acts on the driving dynamics of the motor vehicle, the viscous coupling can be completely and quickly disconnected. In this way, the two drive parts drivingly connected by the viscous coupling are disconnected completely, so that they can no longer influence one another. This is particularly important when activating an anti-lock braking system (ABS) or an electronic stabilization program (ESP), so that engagement for controlling driving dynamics can take place in an optimum way and so that the viscous coupling cannot act against engagement. It is necessary to provide an actuating device for controlling the connecting means.

According to a preferred embodiment, the second plates are connected to the connecting means in a friction locking way when the latter are in the closed condition.

According to a further embodiment of the invention, the second plates form the outer plates and that the second coupling part is provided in the form of a rotational housing. The connecting means is held in the rotational housing and acts on the radial outside of the end faces of the outer plates. Because the available space in the radially outer region of the viscous coupling is larger than in the radial inside, the connecting means can easily be accommodated here.

According to a preferred embodiment, the connecting means comprise at least one guiding bar which, in parallel to the longitudinal axis, is firmly connected to the second coupling part, and at least one push rod which, in parallel to the guiding rod, is axially displaceably supported at the second coupling part. The second plates are held at an axial distance from one another by the guiding rod and by the push rod. The second plates are held in the open position of the connecting means so as to be rotatable around the longitudinal axis, whereas in the closed position they are held so as to be rotationally fast. At least one guiding rod and the at least one push rod extends along the entire length of the annular chamber of the coupling so that they are able to act on all the second plates simultaneously.

According to a preferred embodiment, the at least one guiding rod and the at least one push rod each comprise a plurality of slots which extend transversely to the longitudinal axis and in which the second plates are held with axial play so as to be axially spaced relative to one another. When viewed in a longitudinal section, the slots of the guiding rods and of the push rods are arranged so as to be aligned relative to one another in the open position and offset relative to one another in the closed position.

According to a further embodiment, the connecting means comprise at least two unmovable guiding rods and one push rod arranged therebetween. According to a different embodiment, the connecting means comprises at least two push rods and one guiding rod arranged therebetween. By axially displacing the push rod relative to the guiding rod which is firmly connected to the second coupling part, the second plates are jammed and, respectively, released. Jamming is achieved in that the outer plates are loaded in axially opposite directions by the at least one guiding rod and by the at least one push rod and are thus held in a friction locking way. In the open position of the actuating device, the slots of the two rods are aligned, so that the second plates are out of contact with the side faces formed by the slots and are thus able to rotate freely.

According to a preferred embodiment of the invention, the second coupling part comprises a rectangular longitudinal groove in which there are received that at least one guiding rod and the at least one push rod. Preferably, exactly one guiding rod and exactly one push rod are received in the longitudinal groove.

According to an alternative embodiment, the second coupling comprises a number of adjoining longitudinal grooves, which number corresponds to the number of guiding rods and push rods. The guiding rods and push rods, when viewed in a cross-section, are preferably designed to be circular and the longitudinal grooves, accordingly, have the shape of a semi-circle.

According to a preferred further embodiment of the invention, the actuating device comprises an electromagnet and anchor plate which is arranged at an axial distance from the electromagnet and is loaded by spring means away from the electromagnet. The electromagnet is preferably supported by a rolling contact bearing at the second coupling part so as to be coaxially rotatable relative thereto and axially non-displaceble relative thereto. At least one axially displaceable push rod is firmly connected to the anchor plate and is axially displaced by switching the electromagnet on and off.

According to a preferred further embodiment of the invention, there are provided three groups of connecting means each with at least one guiding rod and at least one push rod which are uniformly circumferentially distributed around the longitudinal axis. The push rods of the connecting means are firmly connected to the anchor plate and are displaced simultaneously when the activating unit is switched. By using several groups of connecting means, it is possible to increase the effective braking force for achieving a friction locking connection between the plates and the second coupling part. Furthermore, because of the conditions of symmetry, there is achieved an advantageous distribution of forces between the coupling part and the plates.

When switching on the electromagnet, the anchor plate is drawn towards it. As a result, the push rods are displaced axially towards the electromagnet and assume a position in which the slots of the push rods are aligned with the slots of the guiding rods. The second plates are no longer in contact with the connecting means and are now able to rotate freely relative to the second coupling part in this open position. In this way it is ensured that the viscous coupling does not counteract the electronic control system for driving dynamics when the latter acts upon the driving dynamics of the motor vehicle. By switching off the electromagnet, the anchor plate is loaded by the spring means, as a result of which the push rods are displaced axially away from the electromagnet out of the aligned position. The outer plates then are axially loaded by the guiding rods and push rods on the outside of their end faces in opposite directions and thus jammed in. In this way, the second plates are connected by friction locking to the second coupling part and rotate jointly around the longitudinal axis in this closed position.

For certain applications, it may be necessary to kinematically reverse the above inventive principle, in which case, the guiding rods and push rods have to be arranged in such a way that the second plates, in the switched-off condition of the electromagnet, with the anchor plate being loaded by the spring means, are able to rotate freely relative to the second coupling part. When the electromagnet is switched on, they are indirectly connected in a friction-locking way to the second coupling part and jointly rotate around the longitudinal axis.

DETAILED DESCRIPTION OF THE PREFERRED EMBODIMENT

Figure 1:
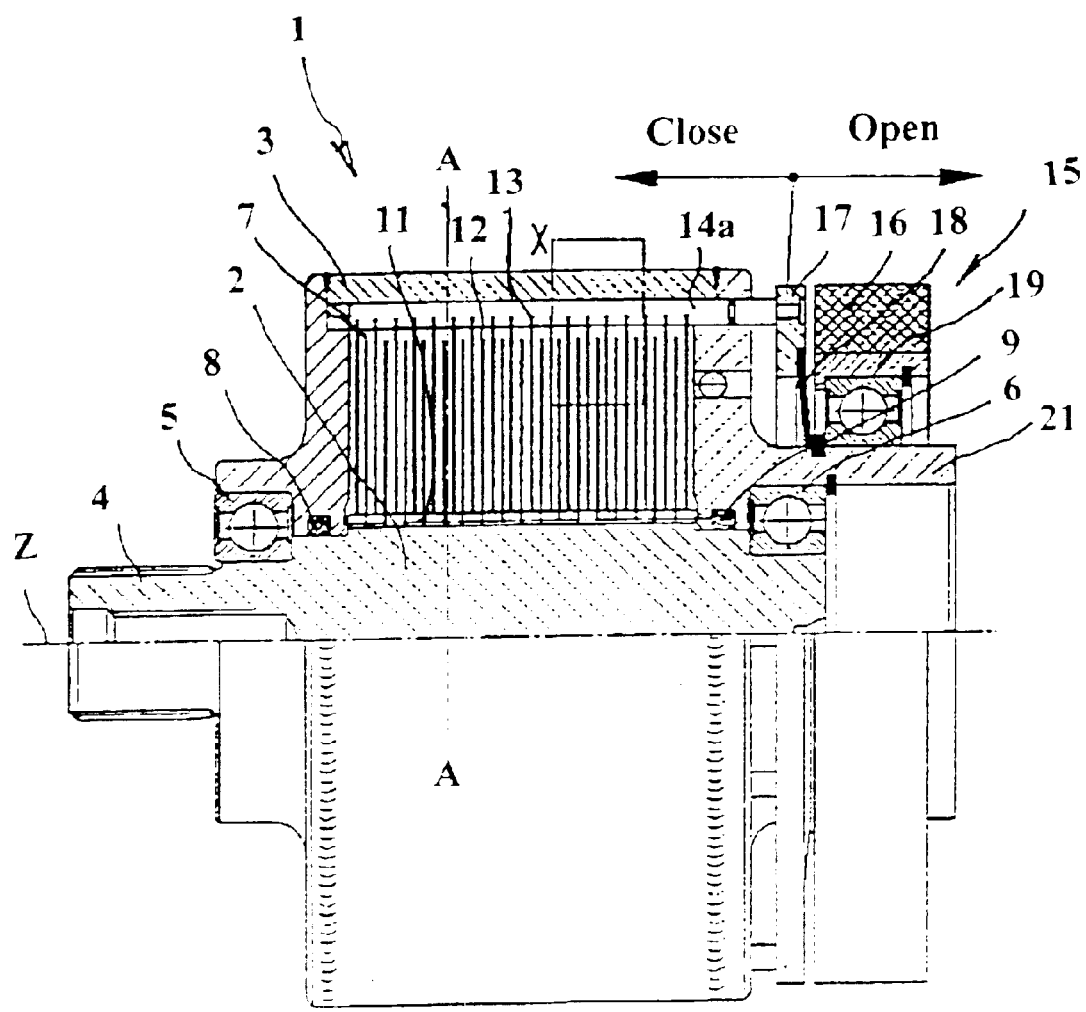
FIG. 1 illustrates a preferred embodiment of the invention of an inventive switchable viscous coupling in a half longitudinal section.

FIG. 1 illustrates a viscous coupling 1 which, substantially, consists of two coupling parts. The first coupling part is provided in the form of a hub 2 and, at one end, comprises a journal 4 with longitudinal toothing for being connected in a rotationally fast way to a shaft. In this way, it is possible for the hub 2 to be rotatingly driven around a longitudinal axis Z. The second coupling part is provided in the form of a housing 3 which is coaxially and rotatably supported by rolling-contact bearings, 5 and 6 on the hub 2. Between the hub 2 and the housing 3, there is formed a cylindrical annular chamber 7 which is sealed towards the outside by sealing means 8 and 9 and filled with a highly viscous medium.

The hub 2 comprises outer toothing 11 on which first plates 12 are held in a rotationally fast and axially floating way. In the longitudinal direction, there are provided second plates 13 which alternate with the first plates 12, which project radially beyond the first plates 12 and which can be connected in a rotationally fast way to the housing 3 by a switching operation, or released therefrom. For this purpose, there is provided connecting means 14a which is controlled by an actuating device 15. It is also possible to provide several sets of controllable connecting means 14a which are uniformly circumferentially distributed around the longitudinal axis Z and are jointly controlled by the actuating device 15.

The actuating device 15 comprises an electromagnet 16 and an axially adjoining annular-disc-shaped anchor plate 17 which is loaded by spring means 18 away from the electromagnet 16 towards the annular chamber 7. The electromagnet 16 is supported by a rolling contact bearing 19 at a sleeve-shaped projection 21 of the housing 3 so as to be coaxially rotatable and axially non-displaceable relative thereto. The anchor plate 17 is axially displaceably arranged in the longitudinal direction between the electromagnet 16 and the housing 3. In the unswitched condition of the electromagnet 16, there is formed an axial gap between the latter and the anchor plate 17. When the electromagnet 16 is activated, the anchor plate 17 is drawn towards the electromagnet 16 against the force of the spring means 18, so that this gap is closed. As soon as the electromagnet 16 is switched off, the anchor plate 17 is released and moved by the force of the spring means 18 towards the annular chamber 7. This is the operating condition of the viscous coupling.

Figure 2:
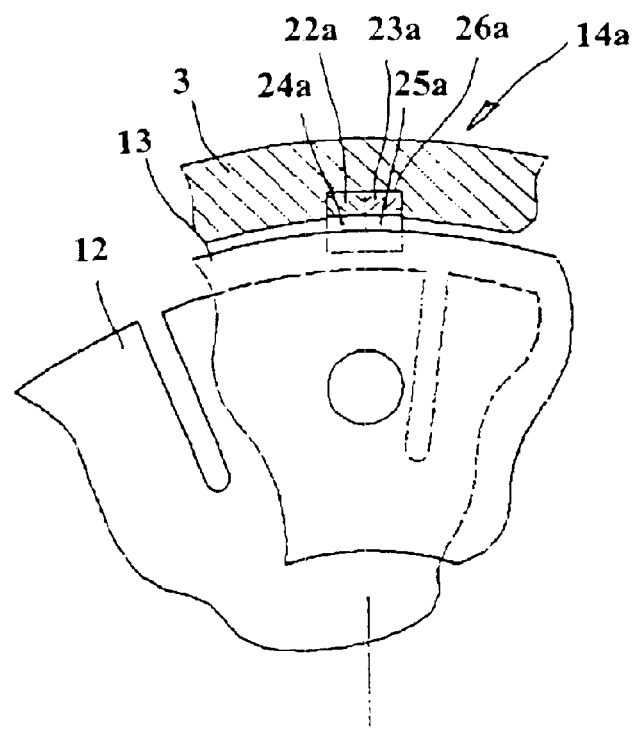
FIG. 2 illustrates the connecting means of the viscous coupling according to FIG. 1 in a cross-sectional view according to the sectional line A—A.
Figure 3:
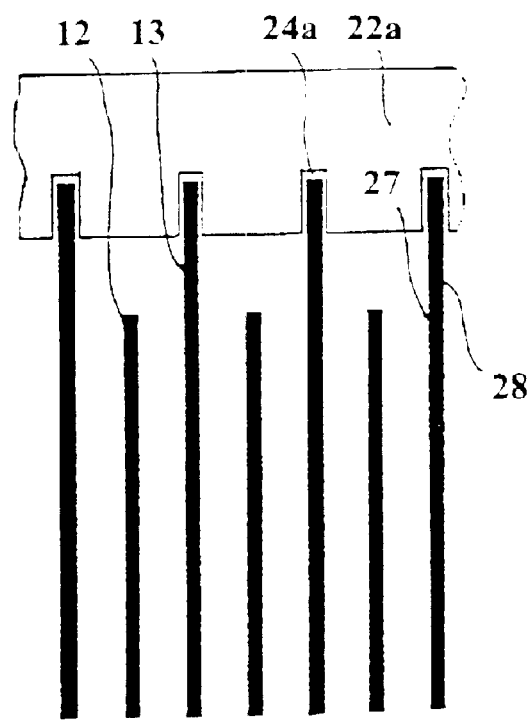
FIG. 3 shows a cut-out Detail X of the viscous coupling according to FIG. 1.

The connecting means 14*a* is actuated by the anchor plate 17. FIGS. 2 and 3 show a first embodiment of the connection means 14*a* in a cross-sectional view. A guiding rod 22*a* which, in parallel to the longitudinal axis Z, is firmly connected to the housing 3. A push rod 23*a* is supported in the housing 3 so as to be axially displaceable in parallel to the guiding rod 22*a*. The guiding rod 22*a* and the push rod 23*a* which, in a cross-secitonal view, have a rectangular profile, engage, side by side, a rectangular longitudinal groove 26*a* in the housing wall. The guiding and push rods 22*a* and 23*a* each have a number of slats 24*a* and 25*a* which extend transversely to the longitudinal axis Z and which number corresponds to the number of second plates 13. As can be seen in FIG. 2, the second plates 13 are held with axial play in said slots 24*a* and 25*a* at an axial distance from one another. When viewed in a longitudinal section, the slots 24*a* and 25*a* of the guiding rod 22*a* and of the push rod 23*a* are aligned in the open position and offset relative to one another in the closed position.

Figure 4:
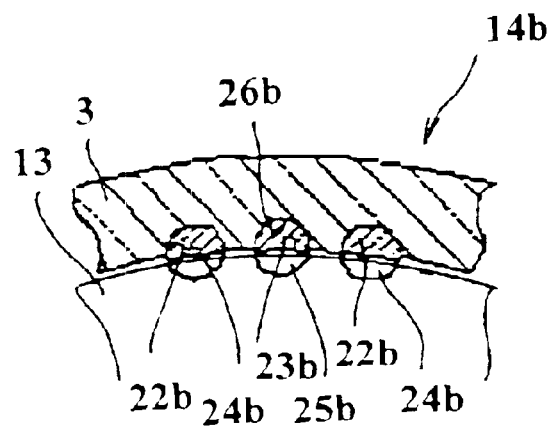
FIG. 4 shows an alternative embodiment of the connecting means in a cross-sectional view.
Figure 4:
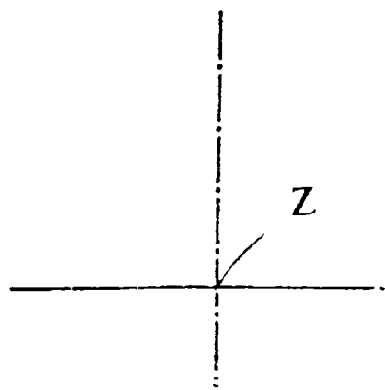

An alternative embodiment hereto is shown in FIG. 4. Its design substantially corresponds to the embodiment shown in FIG. 2. The embodiment according to FIG. 4 deviates from that shown in FIG. 2 in that the connecting means 14*b* according to FIG. 4 comprises two non-displaceable guiding rods 22*b* and an axially displaceable push rod 23*b* which is arranged therebetween and which is connected to the anchor plate 17. Each of the rods 22*b* and 23*b* engages a separate longitudinal groove 26*b*. The longitudinal grooves 26*b* are arranged parallel relative to one another with a small distance existing therebetween, and comprise a semi-circular cross-section. Accordingly, the guiding rods 22*b* and the push rod 23*b* also have a semicircular cross-section.

Figure 5:
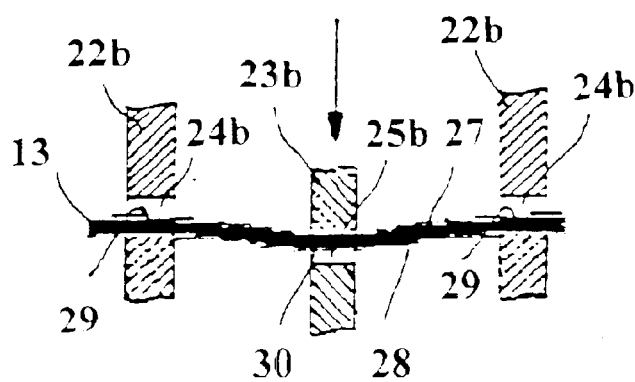
FIG. 5 diagrammatically, shows the cut-out of a plate in a plan view with the connecting means according to FIG. 4.

FIG. 5 illustrates diagrammatically how a second plate 13 is held in a friction locking way by connecting means 14*b* according to FIG. 4 in the closed position, so that they are connected to the housing 3 in a rotationally fast way. The push rod 23*b* is axially displaced relative to the guiding rods 22*b*, which is indicated by the arrow. As a result, the plate 13 is force-loaded in the direction of the arrow by the pressure face 30 of the push rod 23*b* and in the opposite direction by the pressure faces 29 of the guiding rods 22*b*. In this way, the plate 13 is axially jammed and, when viewed in a plan view, it can be seen that the plate 13 is able to bend elastically to become corrugated. By displacing the push rod 23*b* back into the open position, the plate 13 springs back into its planar disc-like shape.

The mode of operation of the connecting means 14*a* and 14*b* and the way in which they cooperate with the actuating device 15 are as follows:

The viscous coupling 1 is used in the driveline of a motor vehicle which comprises an electronic control system for controlling the driving dynamics of the vehicle. The controllable connecting means 14*a* and 14*b* are switched as a function of driving condition parameters which are generated by the control system. Under normal operating conditions, i.e. when the electromagnet 16 is switched off, the anchor plate 17 is loaded by the spring means 18 towards the annular chamber 7. As a result, the push rods 23*a* and 23*b* which are firmly connected to the anchor plate 17 are axially displaced away from the electromagnet 16. The second plates are loaded by the push rods 23*a* and 23*b* away from the electromagnet 16 and by the guiding rods, 22*a* and 22*b* towards the electromagnet. In this way, the second plates 13 are jammed in by friction locking on their radial outside at their end faces 27 and 28 and jointly rotate with the housing 3 around the longitudinal axis Z. This position is referred to as the closed position. The viscous coupling 1 is in operation and is able to transmit torque between the housing 3 and the hub 2 as a result of shear forces in the highly viscous medium, which shear forces occur between the first and second plates in the case of a relative rotation.

If certain driving condition parameters occur, the electromagnet 16 is switched on and the anchor plate 17 is dawn against the electromagnet 16. As a result, the push rods 23*a* and 23*b* are axially displaced towards the electromagnet 16 and assume a position in which their slots 25*a* and 25*b* are aligned with the slots 24*a* and 24*b* of the guiding rods 22*a* and 22*b*. Because of the axial play, the plates 13 are no longer in contact with the pressure faces 29 and 30 of the rods and are now able to rotate freely relative to the housing 3. This position is referred to as the open position. The viscous coupling 1 is out of operation and can no longer transmit torque between the first and the second plates 12 and 13. This is particularly important when an anti-lock braking system (ABS) or an electronic stabilization program (ESP) is activated in order to ensure that the viscous coupling cannot counteract the engagement of the control system.

Figure 6:
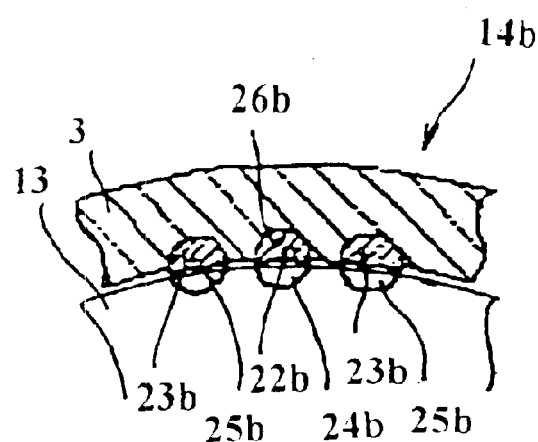
FIG. 6 shows an alternative embodiment of the connecting means in a cross-sectional view.
Figure 6:
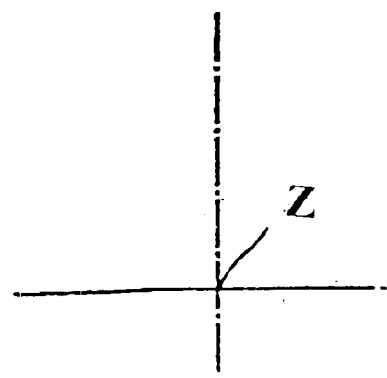
Figure 7:
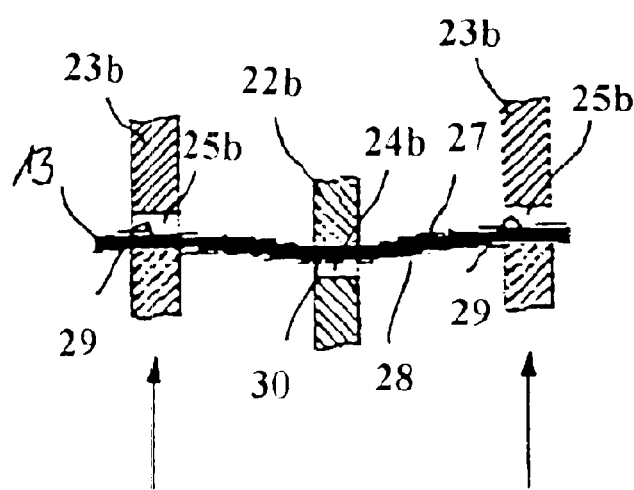
FIG. 7 diagrammatically, shows the cut-out of a plate in a plan view with the connecting means according to FIG. 6.

A yet further embodiment is shown in FIGS. 6 and 7 which design substantially corresponds to the embodiment shown in FIGS. 4 and 5. The embodiments according to FIGS. 6 and 7 deviates from the above described in that the connecting means 14*b* according to FIGS. 6 and 7 comprises one non displaceable guiding rod 22*b* and two axially displaceable push rods 23*b*. The guiding rod 22*b* is arranged between the two push rods which push rods 23*b* are connected to the anchor plate.

I claim:

1. A controllable viscous coupling for generating a locking effect between two coupling parts rotatable relative to one another around a common longitudinal axis, for the driveline of a motor vehicle comprising: a first coupling part and a second coupling part, wherein said first and second coupling parts form a sealed annular chamber which is at least partially filled with a highly viscous medium, first plates connected to said first coupling part in a rotationally fast way and second plates connectable to said second coupling part in a rotationally fast way, wherein said first and the second plates are arranged in the annular chamber so as to alternate in the longitudinal direction, controllable connecting means settable between an open position in which said second plates are freely rotatable relative to said second coupling part, and a closed position in which said second plates are connected to the second coupling part in a rotationally fast way, wherein said connecting means comprises at least one push rod which extends along the length of said annular chamber and, when being moved into the closed position synchronously acts axially on the end faces of said second plates.

2. A viscous coupling according to claim 1, wherein said second plates are connected to said connecting means in a friction locking way when the latter are in the closed condition.

3. A viscous coupling according to claim 2, wherein that said second plates form the outer plates and that said second coupling part is provided in the form of a rotational housing and wherein said connecting means is held in the rotational housing and act on the radial outside of the end faces of said outer plates.

4. A viscous coupling according to claim 3, wherein that said connecting means comprise at least one guiding rod which, in parallel to the longitudinal axis, is firmly connected to said second coupling part, and said at least one push rod which, in parallel to said guiding rod, is axially displaceable supported at said second coupling part, wherein said second plates are held at an axial distance from one another by the guiding rod and by the push rod.

5. A viscous coupling according to claim 4, wherein said guiding rod and said at least one push rod each have a plurality of slots which extend transversely to the longitudinal axis and wherein said second plates are held with axial play so as to be axially spaced relative to one another and wherein, when viewed in a longitudinal section, said slots of the guiding rod are arranged so as to be aligned relative to said slots of said push rod in the open position and offset relative thereto in the closed position.

6. A viscous coupling according to claim 5 wherein said connecting means comprise at least two guiding rods and one push rod arranged therebetween.

7. A viscous coupling according to claim 5, wherein said connecting means comprises at least two push rods and one guiding rod arranged therebetween.

8. A viscous coupling according to claim 4, wherein said second coupling part has a rectangular longitudinal groove in which there is received the at least one guiding rod and said at least one push rod.

9. A viscous coupling according to claim 7, wherein said second coupling part comprises a number of adjoining longitudinal grooves, corresponding to the number of guiding rods and push rods.

10. A viscous coupling according to claim 9, wherein said at least one guiding rod and said at least one push rod, when viewed in a cross-section, are designed to be circular and said the longitudinal grooves have the shape of a semi-circle.

11. A viscous coupling according to any one of claims 1, 5 and 10, wherein an actuating device for operating said controllable connecting means has an electromagnet and an anchor plate which is arranged at an axial distance from the electromagnet and is loaded by spring means away from the electromagnet.

12. A viscous coupling according to claim 11, wherein said electromagnet is supported by rolling contact bearing on said second coupling part as to be coaxially rotatable thereto and axially non-displaceable thereto.

13. A viscous coupling according to claim 12, wherein three groups of said connecting means each with at least one guiding rod and at least one push rod which are uniformly circumferentially distributed around said longitudinal axis and, wherein said push rods of said connecting means are firmly connected to the anchor plate and are displaceable jointly therewith.

* * * * *